Nov. 2, 1948.        G. A. WAHLMARK        2,452,704
HYDRAULIC TRANSMISSION AND CONTROL
Filed Aug. 7, 1943                6 Sheets-Sheet 1

INVENTOR.
Gunnar A. Wahlmark.
BY
his Atty.

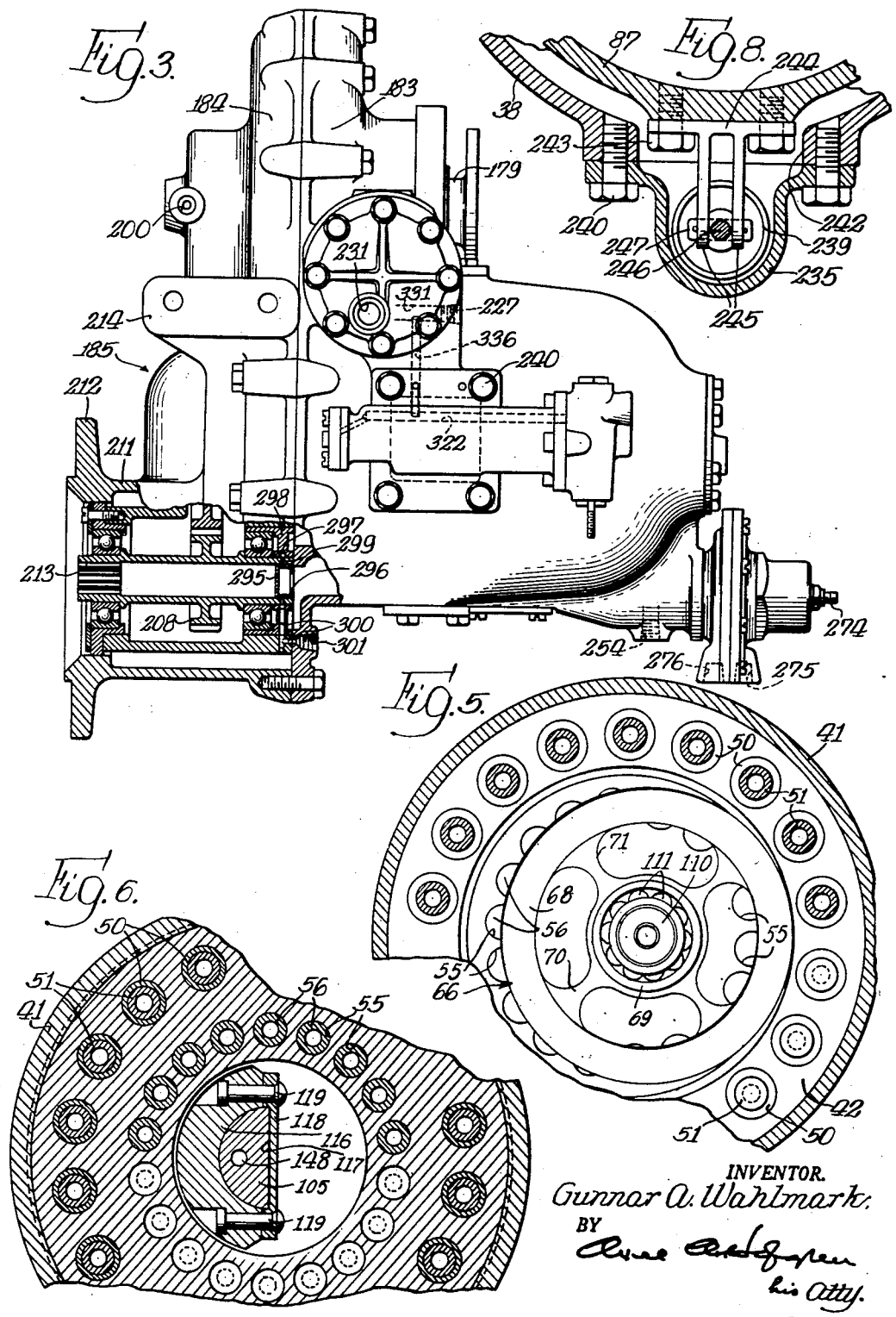

Nov. 2, 1948.   G. A. WAHLMARK   2,452,704
HYDRAULIC TRANSMISSION AND CONTROL
Filed Aug. 7, 1943   6 Sheets-Sheet 3

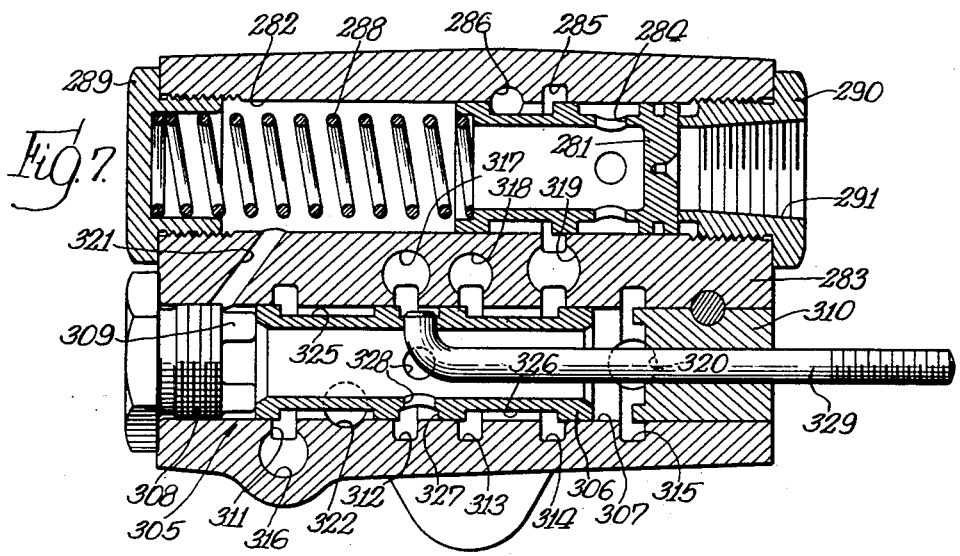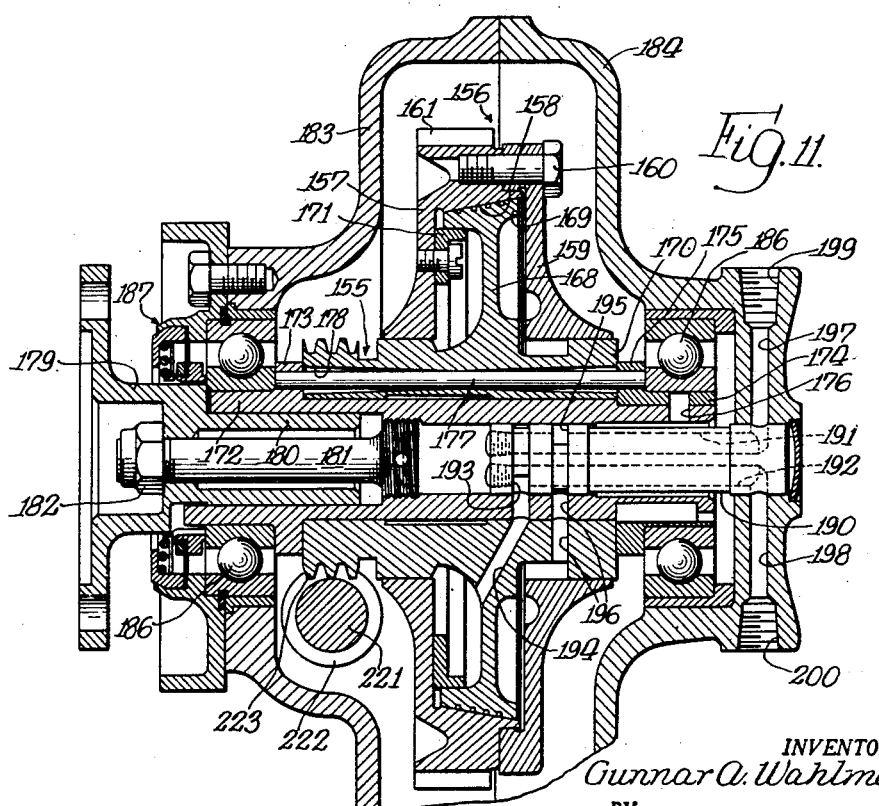

Nov. 2, 1948.  G. A. WAHLMARK  2,452,704
HYDRAULIC TRANSMISSION AND CONTROL
Filed Aug. 7, 1943  6 Sheets-Sheet 5
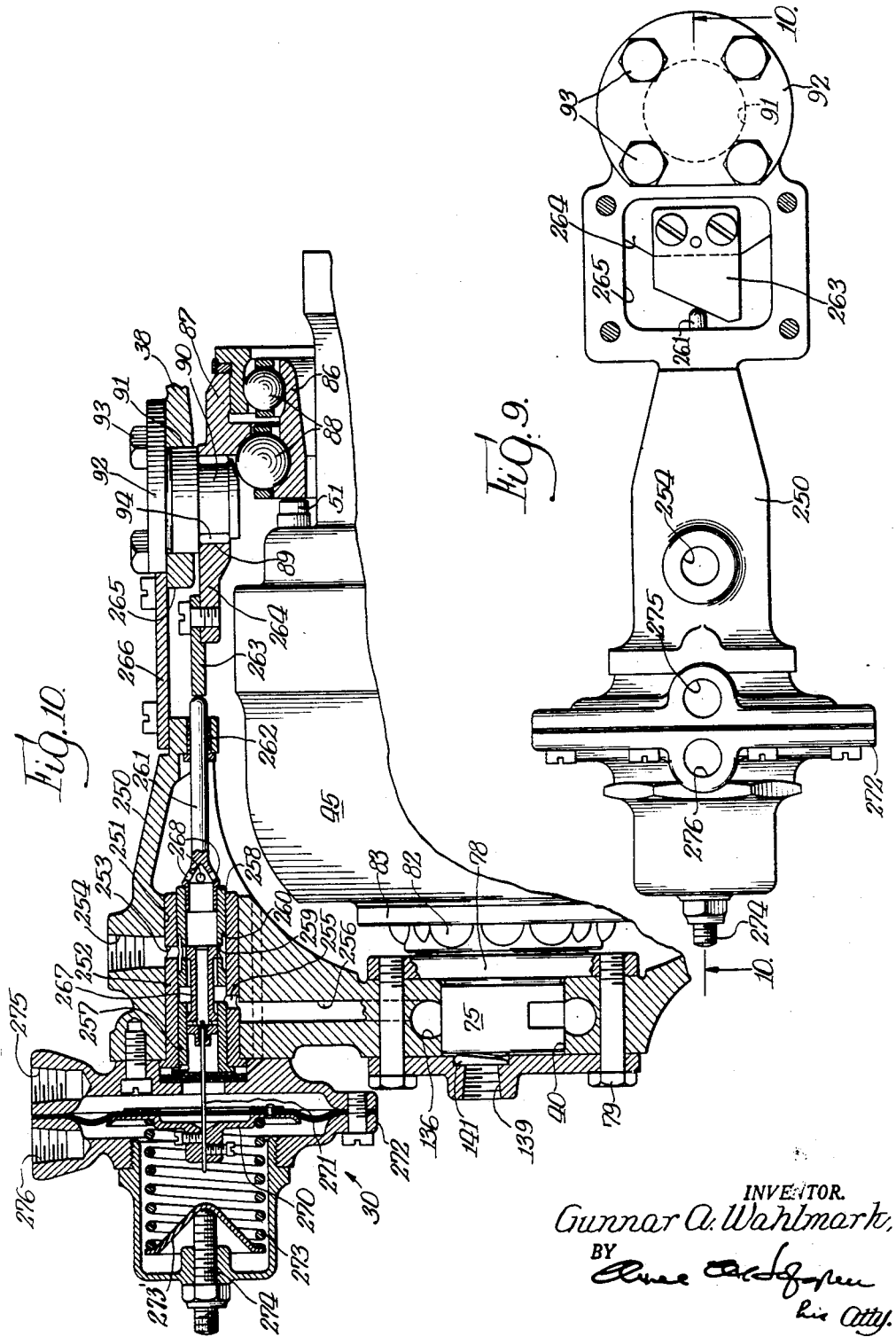
INVENTOR.
Gunnar A. Wahlmark,
BY
his Atty.

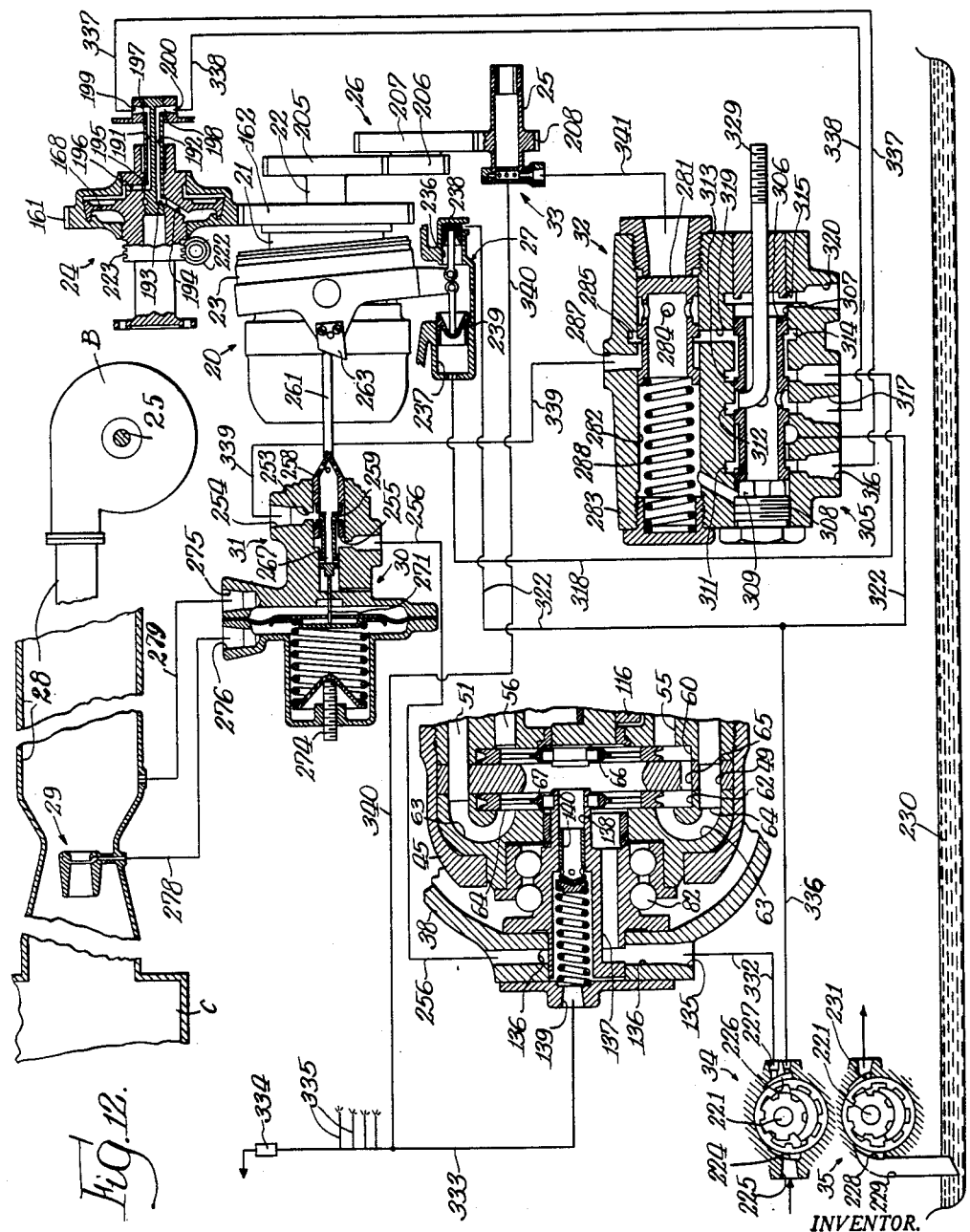

Patented Nov. 2, 1948

2,452,704

UNITED STATES PATENT OFFICE 2,452,704

HYDRAULIC TRANSMISSION AND CONTROL

Gunnar A. Wahlmark, Rockford, Ill., assignor to Sundstrand Machine Tool Co., Rockford, Ill., a corporation of Illinois Application August 7, 1943, Serial No. 497,750

23 Claims. (Cl. 98—1.5)

1

The invention relates generally to hydraulic transmissions, and more particularly to a hydraulic transmission for driving a supercharger, together with control means for automatically adjusting the transmission to maintain a predetermined operation of the supercharger with variations in the air pressure of the chamber being supercharged.

It is the general object of the invention to provide a new and improved transmission for this purpose.

Another object is to provide such a transmission with automatic control.

Another object is to provide a hydraulic transmission particularly adapted for driving a blower for supercharging the cabin of an airplane wherein power is taken off from the airplane engine for driving the blower, together with automatic control for varying the effect of the transmission as the altitude of the plane changes.

Another object is to provide such a hydraulic transmission for aircraft superchargers adapted to take power from a high speed drive shaft, the speed of which may vary from 3000 R. P. M. to 8000 or more R. P. M.

Another object is to provide a new and improved hydraulic transmission having an output shaft which may be operated both faster and slower than the input shaft.

Another object is to provide such a high speed hydraulic transmission with means for effectively cooling the internal parts of the transmission during operation.

Another object is to provide in a hydraulic transmission, having a pump and a motor of the piston type with the pump and motor pistons housed in a common rotatable cylinder block, valve means governing the flow of fluid to and from the pump and motor, all rotatable or permissibly rotatable with the cylinder block.

Another object is to provide a hydraulic transmission, particularly adapted for driving a blower for supercharging the cabin of an airplane, having an output shaft which may be operated both faster and slower than the input shaft, together with automatic control for varying the effect of the transmission as the altitude of the plane changes including means responsive to blower speed.

Other objects will become readily apparent from the following detailed description taken in connection with the accompanying drawings, wherein:

Fig. 3 is a bottom plan view of the hydraulic

Figure 1:
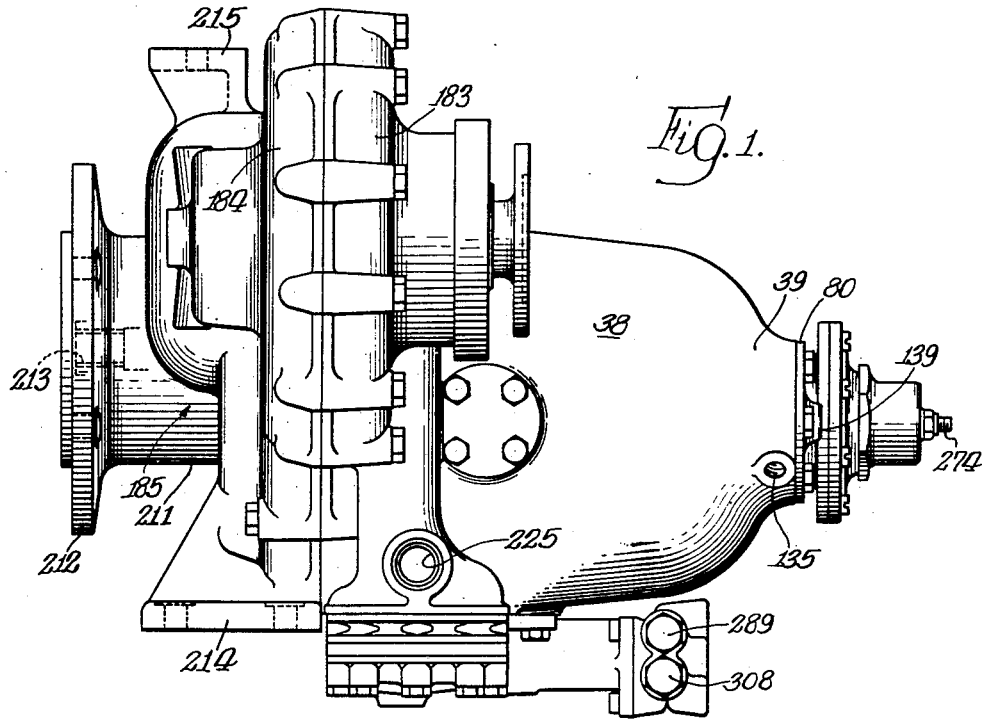
Fig. 1 is a side elevational view of a hydraulic transmission embodying the features of this invention.
Figure 2:
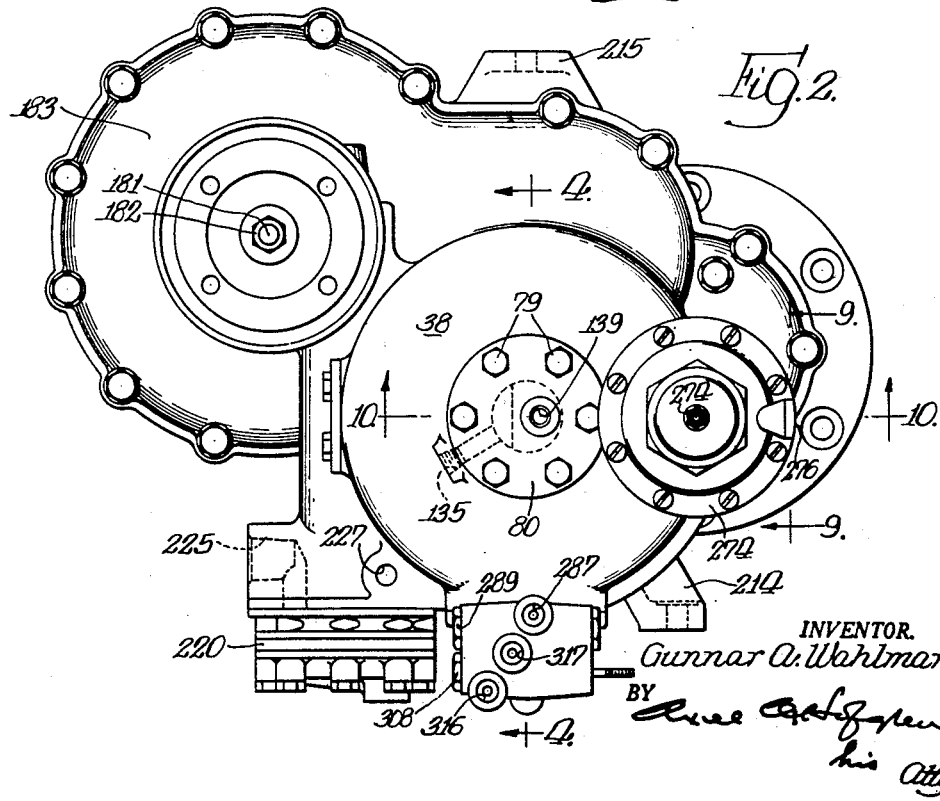
Fig. 2 is an end elevational view of the hydraulic transmission taken from the right in Fig. 1.

2 transmission shown in Figs. 1 and 2, with a part broken away to reveal certain interior structure.

Fig. 4 is a vertical, substantially enlarged sectional view of the transmission taken approximately along line 4—4 of Fig. 2.

Fig. 4a is a fragmentary section along the line 4a—4a of Fig. 4.

Fig. 5 is a fragmentary transverse sectional view taken approximately along the line 5—5 of Fig. 4.

Fig. 6 is a fragmentary transverse sectional view taken approximately along the line 6—6 of Fig. 4.

Fig. 7 is an enlarged sectional view taken approximately along the line 7—7 of Fig. 4.

Fig. 8 is a partial sectional view taken approximately along the line 8—8 of Fig. 4.

Fig. 9 is a fragmentary, side elevational view taken approximately along the line 9—9 of Fig. 2.

Fig. 10 is a view partially in section and partially in elevation, taken approximately along the line 10—10 of Figs. 2 and 9.

Fig. 11 is a diametrical sectional view of a clutch employed in the transmission.

Fig. 12 is a diagrammatic view disclosing primarily the control for the transmission, a portion of the transmission proper being shown both in elevation and diametrical section.

Although the invention is herein disclosed in a form particularly adapted for use in connection with a supercharger for aircraft cabins, it is to be understood that this form has been selected for the purpose of disclosing the principles of the invention and not to limit the invention to this particular application. The scope of the invention will be pointed out in the appended claims.

As shown in the drawings for purposes of disclosure, the invention comprises generally (see Fig. 12) a hydraulic transmission 20 designed for employment in driving a blower (not shown) for supercharging the cabin of an airplane. The transmission has an input or driving element or shaft 21 and an output or driven element or shaft 22 with means, generally designated 23, for varying the operation of the transmission, that is, to obtain a speed of the driven shaft 22 either above or below the speed of the driving or input element or shaft 21. The transmission is adapted to be driven from the aircraft engine power take-off and may be coupled to such power take-off through the medium of a clutch, generally designated 24, while the drive for the blower is effected through a final output shaft 25, driven through step-up gearing 26 by the driven shaft 22.

Modern airplanes are designed for operation from sea level to an altitude of 40,000 feet or above, thus requiring a wide range in the operation of the blower or supercharger to compensate for the changes in air pressure and density resulting from operation of the airplane at these widely different altitudes. The most suitable power source, namely, the power take-off of the airplane engine, also has a wide range of speeds varying in operation from a high of 8000 R. P. M. at the take-off to 3000 R. P. M. while cruising at a fixed altitude. In order that the proper air pressure may be maintained within the cabin of the airplane regardless of the altitude at which it is operating, or of the speed of rotation of the available power source, there is provided as a part of this invention a control system whereby the transmission is constantly and automatically adjusted to bring about that speed of the blower which will maintain in the cabin of the airplane the desired air pressure regardless of the speed of the aircraft engine power take-off or the altitude at which the airplane is flying. Forming an essential part of such control system is a hydraulic means 27 operatively associated with the transmission varying means 23 to cause the transmission to drive the driven shaft 22 either above or below the speed of the driving shaft 21 of the transmission.

The blower conventionally discharges to the cabin of the airplane through a passage 28 having a venturi 29 formed therein. The pressure differential at the venturi is herein utilized to indicate the need for increased or lessened operation of the blower. This pressure differential is impressed upon a pressure responsive device 30 which in turn governs a servo valve 31 associated with the transmission operation varying means 23 and governing in part the operation of the hydraulic means 27. While the hydraulic means 27 is primarily under the control of the pressure responsive means 30, means in the form of a cut-off valve means 32 is provided to exercise control over the hydraulic device 27, this control being in the nature of a limit control preventing the blower from reaching excessively high speeds. The valve means 32 is under the control of a governor, generally designated 33, responsive to the speed of the final output shaft 25. The actuating and control fluid, as well as the make-up fluid for the hydraulic transmission are all supplied from a make-up pump, generally designated 34, while a similar pump 35 maintains the casing housing the transmission free of excess fluid, all in a manner and for purposes that will presently be described. These various elements or units of the invention are housed in joint or individual casings suitably secured together to form a single, unitary structure adapted for ready mounting in operative position, and for coupling to a blower and the power take-off of an aircraft engine. The complete unit, as best seen in Figs. 1 to 3, is of quite irregular configuration.

As best seen in Fig. 4, the transmission 20 comprises a pump and a motor each of the reciprocatory piston type, with the pump having a wobbler, generally designated 36, adjustable varying amounts to either side of neutral position so as to vary the direction as well as the quantity of fluid discharged. Moreover, the transmission is of the rotatable barrel or cylinder block type, that is, having the pump as well as the motor cylinders formed in the same rotatable cylinder block. Such a construction permits of readily obtaining either an over or an under drive of the driven shaft relative to the driving shaft or element, which under these conditions is the cylinder block, simply by adjustment of the wobbler 36. Adjustment of the wobbler 36 with respect to neutral determines whether the motor is driven in the same direction or in a direction opposite to the pump, and hence the resultant speed of the driven shaft 22 is above the speed of the driving shaft 21, in the first instance, and below it in the second. The extent of over or under drive is determined by the extent that the wobbler 36 is swung from its neutral position, the pump and the motor parts being locked and the driving and driven shafts rotating at the same speed when the wobbler is in neutral.

In greater particularity, the transmission 20 is housed in a casing portion 38 which in the main is cup-shaped having an open right hand end, and having at its left end, as viewed in Fig. 4, an end wall 39 with a bore 40 opening therethrough. The transmission, being of the rotatable barrel or cylinder block type, has a rotatable cylinder block, generally designated 41, comprising a main block 42, an annular cylinder block head 43 having a bore 43' axially thereof, and an annular plate 44 interposed between the main block and the head 43. The parts named are secured together in fluid-tight relationship by a sleeve 45 threaded on to the main block 42 and having a radially inwardly projecting flange 46 disposed opposite an annular and opposed shoulder 47 formed on the cylinder block head 43. Set screws 48 are threaded through the annular flange 46 to bear against the shoulder 47. Formed in the main block and extending through the plate and partially into the cylinder block head 43 are a plurality of annularly arranged cylinders 49 disposed parallel with the axis of the transmission and opening through the right hand end of the main block 42, as viewed in Fig. 4. Herein, as best seen in Figs. 5 and 6, eighteen such cylinders are provided. The portions of the cylinders formed in the main block 42 are preferably of enlarged diameter, with a sleeve 50 fitted therein. Reciprocable in each cylinder 49 is a piston 51, preferably hollow to reduce the weight, operable to project in all positions from the right hand end of the cylinder. As will presently be made more apparent, the pistons 51 are pump pistons.

Formed entirely within the main block 42 inwardly of the cylinders 49 are a second plurality of annularly arranged cylinders 55 disposed parallel with the axis of the transmission, and opening through the right end of the block 42, as viewed in Fig. 4. Reciprocable in each of the cylinders 55 is a hollow piston 56 adapted in all operative positions to project through the open right hand end of the cylinders. These pistons, as will later become apparent, are motor pistons and herein their number is the same as the number of pump pistons, namely, eighteen. The face of the main block 42 adjacent the annular plate 44 is formed with a shallow, circular recess 60 to which the motor cylinders 55 open, and which with the annular plate 44 forms a valve chamber at all times in free communication with the chamber 61 formed by the center of the annular plate 44. Formed in the corresponding face of the cylinder block head 43 is a similar, shallow recess 62 forming a valve chamber which similarly is in constant communication with the chamber 61. Leading from each of the cylinders 49 is a passage 63 terminating in a port 64. The ports 64 are disposed in a circle concentric with the valve chamber 62 inwardly a suitable distance from the periphery thereof. In addition to being in communication through the chamber 61, the valve chambers 60 and 62 are in communication at their peripheries through a plurality of longitudinal passages 65 formed in the plate 44.

Operable in the valve chambers 60 and 62 are identical valves 66 and 67 of the wheel-type disclosed and claimed in my U. S. Letters Patent No. 2,190,812, dated February 20, 1940, and most clearly shown in Fig. 5 hereof. Each valve is composed of a rim 68 of a radial width equal to the diameter of the ports 64 or the cylinders 55, which rim has a close, fluid-tight but sliding fit between the end walls of the valve chamber in which it is located. The rim 68 is connected to and carried by a hub 69 through the medium of spokes 70 which are spaced far apart so as to leave a plurality of apertures 71 and which also are of reduced thickness compared to the rim 68, in order to permit of ready flow of fluid from one side to the other of the valve through the apertures 71, as well as circumferentially of the valve.

The valves 66 and 67 have an oscillatory, as distinguished from a rotary, movement within the valve chamber, serving by such oscillatory movement to connect the ports 64 and the cylinders 65 in rotational sequence alternately to the periphery of the respective valve chambers outwardly of the rim 68, and to the chambers inwardly of the rim 68 as clearly shown in Fig. 5, the ports or cylinder openings being completely closed at the time of reversal in the direction of movement of the corresponding piston. To impart such oscillatory movement to the valves relative to the valve chambers, the valves are given an eccentric mounting. Herein the eccentric upon which the valve 67 is mounted is stationary and comprises a cylindrical member 75 received at one end in the bore 40 in the end of the casing portion 38, and at the other end having a reduced, eccentrically disposed projection 76 extending into the valve chamber 62. Rotatably mounted on this eccentric, reduced portion 76 through the medium of roller bearings 77 is the valve 67. Adjacent the end received in the bore 40, the cylindrical member 75 is formed with a radially outwardly projecting flange 78 so that it may be held firmly and non-rotatably in position through the medium of a plurality of bolts 79 extending through an end closure plate 80, the end wall 39 of the casing and threaded into the flange 78. The member 75 additionally forms a support for one end of the cylinder block and to that end it has formed in its external surface intermediate the flange 78 and the eccentric 76 a plurality of circumferential ball bearing raceways 81 in which ball bearings 82 operate. Complementary raceways for the ball bearings 82 are formed in an annular ring 83 carried by the cylinder block head 43.

Completing the pump of the transmission is the wobbler, generally designated 36. Inasmuch as the particular construction of the wobbler forms no part of this invention, it is believed sufficient to state that the wobbler comprises an inner, annular member 86 adapted to bear at all times against the right hand projecting ends of the pistons 51 and an outer, annular member 87 within which the inner member 86 is rotatably mounted through the medium of two sets of ball bearings 88. The parts of the wobbler are in convential, well known manner placed under a preload to take up any play therein. The outer, annular member 87 is, as best seen in Fig. 10, formed with diametrically opposed bores 89 forming bearings for the reception of trunnions 90 forming a pivotal support for the wobbler. Each trunnion projects through a suitable aperture 91 provided in the casing portion 38 and is carried by a plate 92 removably secured over the aperture as by bolts 93 (see Fig. 10). Roller bearings 94 are interposed between the trunnion 90 and the bore 89. With the cylinder block rotatable, the wobbler must be, as was described, stationary or non-rotatable, and the driving element or shaft 21 is formed as a longitudinal extension of the cylinder block.

Completing the motor is a swash plate, generally designated 100, comprising an outer, annular member 101 positioned for constant engagement with the right hand projecting ends of the motor pistons 56. The annular member 101 is, through the medium of three sets of ball bearings 102, 103 and 104, rotatably mounted on a shaft-forming member 105 having an enlarged portion 106 forming an annular shoulder at a fixed inclination to the axis of the shaft-forming member 105. Suitable and complementary raceways are formed in the outer, annular member 101 and the enlarged portion 106 for the bearings 102 and 103, and a raceway for the bearings 104 is likewise formed directly in the outer, annular member 101. The complementary raceway for the bearings 104 is, however, formed in an annular ring 107 adapted to bear at its inner edge against a shoulder 108 and to be retained in that position by a take-up ring 109 threaded onto the shaft-forming member 105. By grinding off the edge of the ring 107 that bears against the shoulder 108 and tightening the take-up ring 109, the swash plate may be placed under a preload to avoid any play therein. At its extreme left hand or inner end, as viewed in Fig. 4, the shaft-forming member 105 terminates in an eccentric 110 upon which the valve 66 is rotatably mounted through the medium of roller bearings 111. Preferably, a seal ring 112 is interposed between the main cylinder block 42 and the shaft-forming member 105 to prevent the loss of fluid from the valve chamber 60. The member 105 is rotatably supported within the main cylinder block 42 through the medium of a ball bearing 113 disposed intermediate the take-up ring 109 and the eccentric 110, and by a ball bearing 114 disposed between the outer end of the shaft-forming member and an annular raceforming ring 115 carried by the longitudinal extension of the main cylinder block forming the driving element or shaft 21. As best seen in Fig. 6, the member 105 is provided with a counterweight 116 disposed opposite the eccentric 110 so as to counterbalance the same. To retain the counterweight against rotation relative to the member 105, the member is, immediately adjacent the eccentric, formed with a flat surface 117, and overlying this surface is a plate 118 to which the counterweight is attached as by rivets or bolts 119.

Forming an outwardly projecting extension of the member 105 is the output or driven shaft 22. Herein this shaft is hollow save for a transverse, internal web 120 located about midway between the ends of the shaft 22 and formed with a central bore 121. At approximately the same point, the shaft 22 is formed with a radially outwardly extending flange 122 which limits insertion of the shaft into a recess 123 formed in the right hand end of the member 105 for that purpose. The shaft 22 is nonrotatably secured in the member 105 by means of a bolt 124 which passes through the bore in the web 120 and is threaded into the member 105, and at its opposite end carries a nut 125 for drawing the shaft tightly into the recess 123. Further support for the member 105 and its extension 22 is provided through the medium of roller bearings 126 interposed between the shaft 22 near its outer end and an annular bearing, race-forming ring 127 having intermediate its ends a radially outwardly projecting flange 128. The annular ring 127 is through its flange secured as by a plurality of bolts 129 to a surrounding element 130 of the casing structure.

Conventionally, make-up fluid is supplied, as by the make-up pump 34, to the transmission to compensate for the fluid lost by leakage, the pump and motor of the transmission being otherwise connected in a closed, hydraulic circuit. At the high speeds at which a transmission driving a supercharger for an airplane must operate, the fluid, if constantly recirculated, as in a closed circuit, becomes excessively heated, and it is therefore a feature of this invention to provide a construction whereby the transmission is constantly cooled by the fluid circulating therethrough. To that end, provision is made whereby fluid greatly in excess of the fluid actually circulated through the pump and motor is supplied to and mingled with the fluid discharged from the motor, thereby permitting fluid at an appropriate temperature to be drawn into the pump. Accordingly, there is formed in the end wall 39 of the casing portion 38 a make-up fluid inlet port 135 (see Fig. 2) adapted for the reception of a conduit leading from the make-up pump 34, as will later be described. This port is in communication with an annular groove 136 in the end wall 39 and opening into the bore 40 therein. The groove 136 in turn is in communication with a passage 137 extending longitudinally of the cylindrical member 75 and opening through the inner or right hand end thereof to the bore 43' in the cylinder block head 43, and hence to both valve chambers 62 and 60, and particularly to the chamber 61. Leading from the chamber 61 is a passage 138 culminating in a make-up fluid outlet port 139 formed in the closure plate 80. Controlling this discharge passage 138 is a relief valve 140 urged to closed position by a compression spring 141 selected to maintain a desired pressure within the chamber 61, herein a pressure of approximately one hundred and ninety-five pounds per square inch. To prevent leakage of the fluid, a sleeve 142 is fitted into the bore 43' of the cylinder block head 43, and bearing against the end of this sleeve is a seal ring 143 carried by the cylinder member 75. The sleeve 142 preferably is provided with a radially outwardly extending flange 144, and the sleeve is held for rotation with the cylinder block by a pin 145 passing through the flange and into the cylinder block head 43.

In order to supply lubricant to the rotating portions of the transmission, the member 105 is formed with a longitudinally extending passage 148 which opens to the interior portion of the valve chamber 60. Partially closing this end of the passage is a lubricating oil metering plug 149. The passage 148 opens into the recess 123 in the member 105 and from this lubricating oil can flow through passages 150 and 151 formed in the shaft 22 and the enlarged portion 106 of the member 105 to the bearings of the swash plate and the bearings 126.

It is pointed out that the valve structure and arrangement particularly adapts the transmission for operation at the high speeds associated with the power take-off of an aircraft engine. It will be seen that from a point beyond the passage 137, which is in free and open communication with the interiors of both valve chambers and the intermediate or mixing chamber 61, all ports and passages rotate with the cylinder block so that there is no necessity of the fluid flowing through some stationary passage or port. Even the valves 66 and 67 are permissibly rotatable with the cylinder block and, moreover, the control of ports by the valves is not through relative rotational movement, but through a radial sliding movement. At the high speeds of operation of a transmission associated with an aircraft engine, the relative speeds between a rotating valve and the ports controlled thereby would be so great as to prevent successful operation of such a structure.

The transmission, as above stated, is intended to be driven from the power take-off of the aircraft engine. While this might be a direct drive, preferably the power is transmitted through the clutch 24 in order that the operation of the transmission may be under the control of the pilot of the airplane. As best seen in Fig. 11, the clutch 24 comprises a driving element, generally designated 155, and a driven element, generally designated 156. The driven element comprises an annular member 157 providing an internal, peripheral and inclined clutch surface 158, and a complementary, annular member 159 secured thereto as by bolts 160. Teeth 161 are formed on the periphery of the annular member 157 and the gear thus formed is adapted to mesh with a gear 162 secured by bolts 163 on the driving shaft or element 21 of the transmission. The gear 162 preferably has a radially inwardly projecting flange 164 through which the bolts 163 project to secure the gear in position, and which forms a race for a set of roller bearings 165 interposed between the flange and the sleeve 127. The driven element also forms a cylinder movable axially relative to the driving member to effect engagement or disengagement of the clutch under the influence of hydraulic pressure, as will presently become more apparent.

The driving member comprises a disk 168 having a wide rim 169 adapted for cooperation with the surface 158 and an elongated hub 170 on which the driven element is mounted for relative rotational as well as axial movement. An annular ring 171 is prefebaly secured to the annular member 157 spaced inwardly from the surface 158 to provide an annular guide channel into which one edge of the rim 169 projects. Within the hub 170 is a tube 172 having adjacent one end an outwardly extending flange 173 and carrying on the other end a sleeve 174 having a similar outwardly extending flange 175. The sleeve 174 is non-rotatably secured on the tube by a pin 176. Secured at their ends in the flanges 173 and 175 are a plurality of rods 177 projecting through passages 178 formed in the hub 170. The passages at their approximate midpoint receive the rods 177 in a close fit and taper outwardly in both directions from the midpoint so as to permit the rods to take up the torsional vibration that tends to be transmitted from the power take-off of the aircraft engine. Received in one end of the tube 172 is a flanged, hollow shaft 179 for convenient attachment to the power take-off of the aircraft engine. This shaft has a reduced portion 180 which is received within the tube with the shaft securely and non-rotatbly retained in the tube by a stub shaft 181 threaded into the tube 172 and carrying a nut 182 by which the shaft 179 is tightly held. The clutch is enclosed in a casing portion, one-half 183 of which is integral with the transmission casing portion 38, and the other half 184 of which is part of an end closure, generally designated 185.

The tube 172 is rotatably journaled at each end in ball bearings 186 supported in the casing portions 183 and 184. A rotary seal, generally designated 187, is provided at that end of the casing through which the shaft 179 projects.

As previously stated, the clutch is intended for hydraulic operation, and to that end there is forced into the tube in fluid-tight relationship thereto a cylindrical member 190 having formed therein in well known manner longitudinally extending passages 191 and 192. At its inner end, the passage 192 opens to an external groove 193 which registers with a passage 194 formed in part in the tube 172 and in part in the hub 170 to open to the left hand side of the disk 168, as viewed in Fig. 11. Passage 191 opens to an external groove 195 which registers with a passage 196, again formed in part in the tube 172 and in part in the hub 170, and opening to the right side of the disk 168, as viewed in Fig. 11. The cylindrical member 190 also has a fluid-tight fit in the casing portion 184, where the passages 191 and 192 communicate, respectively, with passages 197 and 198 terminating in external ports 199 and 200.

While the blower or supercharger for the cabin of the airplane might be driven directly from the driven shaft 22 of the transmission, it is, as previously stated, generally driven from an ultimate output shaft 25. This output shaft 25 is driven from the shaft 22 through a train of step-up gears 205, 206, 207 and 208 (see Fig. 12). These gears are so proportioned as to cause the shaft 25 to be driven at a ratio of 4:1 with respect to the shaft 22. The gear 205 is secured to the shaft 22 by means of bolts 209 threaded into a flange 210 formed on the shaft while the gear 208 is formed as a part of the shaft 25. The gears 206 and 207 are rotatably mounted in conventional manner in the end closure 185, while the shaft 25, likewise, is rotatably mounted in a tubular projection 211 formed integral with the end closures 185, as best seen in Fig. 3. This tubular projection is provided with an outwardly extending flange 212 for convenience in attachment to the blower or supercharger. The shaft 25 is hollow and is formed with internal splines 213 at its outer end for driving engagement with the shaft of the blower. As best seen in the elevational views Figs. 1 to 3, the end closure 185 has formed integrally therewith drilled brackets 214 and 215 by means of which the entire unit may be conveniently mounted in position.

The make-up pump 34 and the pump 35, which for convenience may be termed a scavenger pump, are of identical construction and are of the well known gear type. The pumps are housed in a casing portion 220 bolted to the bottom of the main casing below and to the left of the casing portion 38, as viewed in Fig. 2. The pumps are disposed with the scavenger pump 35 below and in alignment with the make-up pump 34 so that the pumps may have a common driving shaft 221. This shaft extends vertically upwardly and at its upper end, as best seen in Fig. 11, carries a worm wheel 222 engaging a worm 223 formed integral with the hub 170 of the driving element of the clutch. It will be seen, therefore, that the pumps 34 and 35 are driven whenever the aircraft engine is driven, regardless of whether the clutch 24 is engaged or disengaged. As shown diagrammatically in Fig. 12, the make-up pump has an intake port 224 communicating with an external port 225 (see Figs. 1 and 2) for the reception of a conduit leading to the aircraft engine from which the make-up fluid for the transmission and the control fluid are drawn. The make-up pump 34 also has a discharge port 226 from which several passages branch, including one terminating in an external port 227 (see Fig. 2) for the reception of a conduit leading to the make-up fluid supply port 135 of the transmission. The scavenger pump 35 has an intake port 228 connected by a conduit diagrammatically shown at 229 in Fig. 12 to an oil sump 230 which is formed within the casing enclosing the transmission. The scavenger pump operates to maintain the transmission casing free of oil, since it would be detrimental to have the parts operate in oil when rotating at the high speeds here required. The oil thus drawn from the sump within the transmission casing is discharged through an outlet port 231 having an external terminus (see Fig. 3) for the reception of a conduit (not shown) returning the oil to the aircraft engine.

Having described the transmission and related power transmitting parts, the control for the transmission will now be described. As generally stated above, this control includes hydraulic means, generally designated 27, which governs the position of the transmission operating varying means, that is, the wobbler 36. The means 27 comprises a cylinder 235 having a bore 236 at one end and a larger bore 237 at the other end. Operable in the respective bores are opposed pistons 238 and 239. The cylinder is secured as by bolts 240 to the underneath side of the casing portion 38 housing the transmission, and has formed in its upper side an enlarged opening 241 registering with the corresponding opening 242 in the bottom of the casing portion 38. Secured to the wobbler, as by bolts 243, is (Fig. 8) a bracket 244 having a pair of plates 245 projecting through the openings 241 and 242 into the cylinder 235 between the pistons 238 and 239. A piston rod 246 for each of the pistons is pivotally connected as by a pin 247 between the plates of the bracket 244. The opposite end of each piston rod is rounded and bears against a socket 248 formed on the inside of each of the pistons. The smaller of the pistons 238 is adapted to be constantly acted upon by fluid under a given pressure, and this piston acts to shift the wobbler in such direction as tends to result in an under drive of the shaft 22. The piston 239 in turn is supplied with fluid under pressure at such times and in such quantities as to bring about such operation of the transmission as will result in operation of the blower producing the desired air condition within the cabin of the airplane.

The fluid supplied to the piston 239 is primarily under the control of the servo valve 31, which in turn is governed by the means 30 responsive to the air condition in the cabin of the airplane. The servo valve means is housed in a lateral enlargement 250 of the casing portion 38. The enlargement 250 has a bore 251 in which is fixed a bushing 252 having a port 253 therein communicating with an external port 254 formed in the enlargement 250 for the reception of a conduit, not shown in this figure. The bushing 252 has a second radial port 255 in communication with a passage 256 communicating with the passage 136 to receive fluid from the make-up pump 34. Fixed within one end of the bushing 252 is a bushing 257 of such length as to leave at least a portion of the port 255 uncovered. Slidable in the other end of the bushing 252 is a sleeve 258 having intermediate its ends a plurality of radial ports 259 opening into a wide, external groove 260 which is in all positions of the sleeve 258 in communication with the port 253. Projecting from the sleeve is a stem 261 guided by a bushing 262, carried by the casing, into engagement with the edge of a cam plate 263 bolted to a projection 264 of the external member 87 of the wobbler. The casing portion 38, opposite the cam 263, is formed with an opening 265 which is closed by a removable plate 266 to give ready access to the cam. Slidable in the bushing 257 and in the sleeve 258 is a spool valve 267 whose right hand land, as viewed in Fig. 10, is just equal in width to the ports 259 and whose groove between the lands bridges the space between the bushing 257 and the sleeve 258, and hence the port 255. The stem 261 is formed with a plurality of holes 268 immediately adjacent the sleeve 258 through which fluid flowing to the interior of the sleeve 258 through the ports 259, when uncovered by relative movement of the spool valve 267 to the left, may flow into the casing and to the oil sump in the casing.

The spool valve 267 is adapted to be actuated by the diaphragm 270 of the pressure responsive device 30 which is secured to the casing enlargement 250. To that end a stem 271 of the spool valve 267 is secured to the diaphragm of the pressure responsive device. The device is of conventional construction having a two-part casing 272 bolted together with the diaphragm 270 clamped therebetween to form opposed chambers. A compression spring 273 biases the device in one direction, and to that end bears at one end against the diaphragm 270 and at the other end against a concave washer 273', a screw 274 backing the washer and being adjustable to determine the extent of the bias. The casing has two ports 275 and 276 formed therein, one opening to each chamber and adapted for the connection of external conduits.

As already stated generally, the blower or supercharger B conventionally discharges to the cabin C of the airplane through a passage 28 (see Fig. 12) having a venturi 29 located therein. The port 276 is by conduit 278 connected to the venturi to subject the one chamber of the pressure responsive device to the reduced pressure at the throat of the venturi. Port 275 is by conduit 279 connected to the passage 28 on the blower side of the venturi, so as to subject the other chamber of the pressure responsive device to the higher pressures at that point. While the pressure responsive device may be set to maintain any desired condition, it is normally adjusted to maintain an air condition in the cabin of the airplane equivalent to that found at an altitude of from 8000 to 10,000 feet.

The cut-off valve means, generally designaed 32 (Fig. 7) which serves to prevent the blower from being driven at excessively high speeds, comprises a valve 281 of the piston type slidable in a bore 282 formed in a casing 283 bolted to the cylinder 235 at the end of the large bore 237 therein. The valve 281 is formed with three lands, one at each end an an intermediate land, and with a plurality of apertures 284 opening radially through the valve intermediate the middle and the right hand land, as viewed in Fig. 7. The casing in turn is formed with an annular groove 285 opening through the bore and a port 286 also opening to the bore and also terminating in an external port 287 for the reception of a conduit. The valve is urged to a normal position by a compression spring 288 bearing at one end against the open end of the valve and at the other end against a plug 289 closing one end of the bore 282. The normal position of the valve is determined by abutment with a plug 290 threaded in the opposite end of the bore 282 and formed with a threaded recess or port 291 for the reception of a conduit through which pressure fluid is supplied to act upon the valve. In the normal position of the valve, the port 286 and the groove 285 are bridged by the valve, and as the valve moves away from normal position it first isolates the port 286 and thereafter opens the groove 285 to communicate with the interior of the valve through the openings 284.

As stated above, the valve means 32 is in the nature of a cut-off valve preventing the blower or supercharger from being driven at excessive speeds. Accordingly, the fluid supplied to the port 291 to act on the valve 281 is given a pressure proportional to the speed of the blower. Accordingly the governor or speed responsive means, generally designated 33, is provided which herein takes the form of a simple, centrifugal pump for creating static pressure. The pump is formed by mounting, in the end of the ultimate output shaft 25 opposite the splines 213, a cup 295 having an aperture 296 in one side thereof for the reception of low pressure fluid. Opening through the peripheral wall of the cup, as well as through the shaft 25, to an annular groove 297 formed in a casing member 298 are a plurality of radial bores 299 (see Figs. 3 and 12). The groove 297 is by a passage 300 connected to a port 301 adapted for the reception of a conduit leading to the port 291, as will presently be described.

Completing the controls is a manually-actuable valve means, generally designated 305, which governs engagement or disengagement of the clutch 24 and which incidentally also exercises control over the fluid supplied to the larger cylinder 237 of the wobbler adjusting means 27. The valve means 305 comprises a sleeve valve 306 reciprocable in a bore 307 formed in the casing 283 housing the valve 281. One end of the bore 307 is closed by a plug 308 having a reduced and apertured portion 309 forming an abutment determining the clutch engaged position of the valve 306. The other end of the bore is closed by a plug 310 and abutment of the adjacent end of the valve 306 with plug 310 determines the clutch disengaged position of the valve. Formed in the casing and opening to the bore are a plurality of annular grooves 311, 312, 313, 314 and 315. The first and the second of these, namely, 311 and 312, communicate with external ports 316 and 317 for the reception of conduits leading to the ports of the clutch. Groove 313 is by a passage 318 in constant communication with the larger cylinder 237 of the wobbler adjusting means, while groove 314 is through a passage 319 in constant communication with groove 285 of the cut-off valve means. Groove 315 is through a port 320 connected to the oil sump in the casing housing the transmission. Opening to the bore 307 opposite the reduced portion 309 of the plug 308 is a passage 321 leading from the bore 282, and opening to the bore 307 intermediate the grooves 311 and 312 is a passage 322 communicating at its other end with the smaller cylinder 236 of the wobbler adjusting means (see Fig. 3).

The valve 306 is formed with four lands, one at each end and two at the middle, the latter two being but slightly spaced. There result two peripheral recesses 325 and 326 of equal and substantial width, and a narrow, intermediate recess 327. Opening to the hollow interior of the valve 306 from the recess 327 are a plurality of radial openings 328. Inserted in one of the openings 328 is an end of a stem 329 which projects through the plug 310 for manual actuation of the valve 306. The spacing of the recesses formed in the valve 306 is such that when the valve is in its clutch engaged position, as shown, the recess 325 bridges the groove 311 and the opening of the passage 322. Recess 327 is in communication with groove 312 so that that groove is through the radial opening 328 connected to the oil sump and the recess 326 bridges the grooves 313 and 314. When the valve is in its clutch disengaged position, that is, in abutment with the plug 310, groove 311 is uncovered and thus is through the interior of the valve connected to the oil sump while recess 325 now bridges groove 312 and the opening of passage 322. Groove 313 is now through recess 327 and radial openings 328 connected to the oil sump, while groove 314 is blocked. It is to be noted that the inner face of the plug 310 is notched so that when the valve is in abutment therewith the interior of the valve is still in communication with the groove 315.

As most readily seen from Fig. 12, the transmission, the clutch and the various control devices are all connected in a properly integrated, hydraulic circuit. In part the circuit is formed, as already indicated, by passages within the various casing structures, while other parts are formed by external piping. Where the term "conduit" is used hereinafter, it is intended to mean either such internally formed passages or piping.

Tracing the circuit from its source, the intake port 224 of the make-up pump 34 is, as already stated, connected by a conduit (not shown) to the oil tank of the aircraft engine. Leading from the discharge port 226 of the make-up pump (see Fig. 3) is a first passage 331 terminating in the external port 227 which is by a conduit 332 connected to the make-up fluid supply port 135 for the transmission. From thence a major part of the fluid flows through the already described passages 136 and 137 to the valve chambers 60 and 61 and thence outwardly through the passage 138, relief valve 140, and the external port 139 formed in the closure plate 80. A minor part is by the already described passage 256 supplied to the servo valve means 31. Leading from the port 139 is a conduit 333 returning the fluid to the oil tank of the engine. Interposed in this conduit is a relief valve 334 adapted to maintain a pressure of approximately fifteen pounds per square inch in the conduit 333. Branching from the conduit 333 between the port 139 and the relief valve 334 are a plurality of lubricating outlets or jets 335 which spray oil onto certain vital parts of the transmission. The oil thus sprayed is collected in the oil sump 230 along with other lubricating or leakage fluid, and is by the scavenger pump 35 through conduit 229 and a conduit (not shown) drawn from the sump and returned to the oil tank of the engine.

Also leading from the discharge port 226 of the make-up pump is a conduit 336 in the form of a passage (see Fig. 3) communicating with the passage 322 which, as already stated, communicates at one end with the cylinder 236 and at the other end communicates with the bore 307 of the valve means 305. The pressure of the fluid in these conduits is that maintained by the valve 140 which, as already stated, is approximately one hundred and ninety-five pounds. It will be seen that this pressure acts constantly upon the piston 238 tending to shift the wobbler 23 to its under drive position. It will also be seen that the opening of the passage 322 to the bore of the valve 305 constitutes the supply port for the fluid actuating the clutch 24. Completing the circuit for the clutch is a conduit 337 leading from the port 316 of the valve 305 to port 199 of the clutch, and a conduit 338 leading from the port 317 to the port 200 of the clutch.

Port 254 of the servo valve is by a conduit 339 connected to the port 287 of the cut-off valve 32 and the circuit to the larger cylinder 237 is completed through the already described passages in the valve casing 283 and the passage 318. Low pressure fluid for the centrifugal pump or governor 33 is supplied by a conduit 340 connected to the conduit 333 intermediate the port 139 and the valve 334, and the static pressure developed by the governor 33 is transmitted to the valve 281 through a conduit 341.

Having described the transmission and its controls, the operation thereof will now be described. Let it be assumed that the airplane with which the transmission is associated is on the ground, that the aircraft engine is idling, and that the valve 306 is shifted to its clutch disengaged position. Under these conditions, though the transmission is not being driven, the make-up pump 34 and the scavenger pump 35 are being driven and thus make-up fluid is being supplied to the transmission through the conduit 332, and passages 136 and 137. Fluid is also being supplied to the port 255 of the servo valve through the conduit 256, and fluid is being supplied to the smaller cylinder 236 of the wobbler adjusting means and to the bore of the valve means 305 at the opening of the passage 322 thereto. With the valve 306 in its clutch disengaged position, the passage 322 is now connected to the port 317 and fluid from the make-up pump, which is maintained at one hundred and ninety-five pounds per square inch pressure by the valve 140, is supplied through the conduit 338 to the port 200 of the clutch. From thence it flows through passages 198 and 192, port 193 and passage 194 to the left side of the disk 168. Fluid from the right side of the disk 168 is exhausted through passage 196, port 195, passages 191 and 197, port 199, conduit 337, port 316, groove 311, the passage through the valve 306, groove 315, and port 320 to the oil sump. The clutch thus is in disengaged position and the transmission is not in operation. The cylinder 237 of the wobbler adjusting means is also connected to the sump, such connection being through passage 318, groove 313, intermediate recess 327 of the valve 306, radial openings 328, the interior of the valve and groove 315. With the cylinder 237 connected to the sump, the fluid acting on the smaller piston 238 will shift that piston as well as piston 239 to the left to the limit of movement, thereby adjusting the wobbler to its maximum under drive position. Under these conditions, the adjustment of the wobbler may well not be in harmony with the pressure responsive means 30, so that the port 259 in the sleeve 258 may be shifted to the left of the land on the right end of the spool valve 267 to complete communication between the port 255 and the port 253. The fluid permitted to flow in the conduit 339 under these conditions would, however, be ineffective because of the blocking of the passage 319 by the valve 306 when in clutch disengaged position.

At a suitable time in the preparation for the take-off, the pilot of the airplane would shift the valve 306 to its clutch engaged position. In this position, the passage 322 is connected to the groove 311, while the groove 312 is connected to the oil sump which is just the reverse of the connection previously described and results in a supply of fluid under pressure to the right hand side of the disk 168 and a discharge of fluid from the left hand side resulting in engagement of the clutch. The transmission will now be driven and will in turn drive the blower to supply air to the cabin of the airplane. Initially the transmission will operate to produce an under drive of its driven shaft 22 relative to its driving element or shaft 21 to drive the blower at a minimum speed, especially if the aircraft engine is still operating at idling speed. Shift of the valve 306 to clutch engaged position, however, has completed the circuit from the servo valve to the larger cylinder 237 by bridging of the grooves 313 and 314 of the valve means 305, and thus the position of the wobbler will be adjusted in accordance with the air pressure conditions.

With the aircraft engine operating at the relatively low idling speed, the blower will likely not be able even at sea level to produce such a pressure differential between the venturi 29 and a point in the passage 28 on the blower side of the venturi as will call for the wobbler being in its extreme under drive position. As a result, fluid will flow to the cylinder 237, tending to return the wobbler to an over drive position until movement of the sleeve 258 in response to such movement of the wobbler results in exact registry of the right hand land on the spool valve 267 with the ports 259 in the sleeve 258, cutting off further supply of fluid to the cylinder 237.

As the speed of the aircraft engine is stepped up for the take-off, which speeds range from 4000 R. P. M. to 8000 R. P. M., the speed of the blower will likewise be stepped up, thereby increasing the pressure differential acting on the pressure responsive device 30 causing the spool valve 267 to be shifted to the left. This will open the ports 259 to the stem end of the sleeve 258, thereby connecting the cylinder 237 to the oil sump. This connection may be traced as follows: Cylinder 237, passage 318, groove 313, peripheral recess 326, groove 314, passage 319, groove 285, port 287 and conduit 339. As a result, the fluid acting on the smaller piston 238 will again shift the wobbler toward its under drive position until the cam 263 carried by the wobbler and acting through the stem 261 shifts the sleeve 258 to the left to an extent such that the right hand land on the spool valve 267 again closes the ports 259. As the airplane gains altitude, the pressure differential for a given speed of the blower will drop and hence tend to shift the spool valve 267 to the right, which then will again result in a supply of fluid to the larger cylinder 237 to adjust the wobbler toward over drive position. On the other hand, as the plane gains its desired altitude and levels off, the aircraft engine will slow down to a cruising speed, and the speed of the blower correspondingly will drop, causing a further decrease in air pressure differential and resulting in a further shift of the wobbler toward over drive position. In brief, for a constant speed of the aircraft engine, a rise of the airplane to a higher altitude will result in an adjustment of the wobbler in over drive direction, thereby increasing the speed of the blower until the desired conditions are again reached. Conversely, with a dropping of the plane to a lower altitude, the shift of the wobbler will be toward under drive conditions, with a corresponding decrease in the speed of the blower until the predetermined conditions are again reached. At a constant altitude, an increase in the speed of the aircraft engine will result in an adjustment of the wobbler toward under drive position so as to maintain the blower speed constant, while a decrease in the aircraft engine speed will result in adjustment of the wobbler toward over drive position, still to keep the blower speed constant.

Under most conditions, control of the transmission will be under the pressure responsive device 30. However, should the airplane be operating near the limit of its maximum altitude, for example 40,000 feet, the wobbler would probably be adjusted to its extreme over drive position. Should the aircraft engine, under those conditions, be stepped up to its maximum speed of 8000 R. P. M., the blower would be driven in excess of 32,000 R. P. M. which might well cause injury to the blower. This condition is guarded against by the cut-off valve 281 and the governor 33 which is responsive to the speed of the blower. Herein the spring 286 is so selected and adjusted that it will begin to yield under the static pressure produced by the governor 33 when the blower is operating at 27,000 R. P. M. The valve 281 under the influence of the pressure produced by the governor 33 will thus gradually close the groove 285, and, if the speed of the blower continues to rise above 27,000 R. P. M., may completely block the circuit from the servo valve to the cylinder 237 and, in fact, may even connect the cylinder 237 to the sump so as to result in a shift of the wobbler toward under drive position to reduce the speed of the blower.

Herein the pressure responsive device 30 is adjusted to cause the wobbler to assume neutral position at cruising speed, at about 8000 feet altitude. Under this condition of adjustment, the pump is pumping no fluid and the pump and the motor are locked and rotating as a unit with the cylinder block which, of course, is the most efficient operation. The desirability of a transmission of the character here disclosed for this purpose will be appreciated when it is understood that, for a slight under drive or over drive, only that small amount of fluid need be pumped which will create the difference in the relative speeds of the driving and driven shafts of the transmission, as distinguished from that amount of fluid which would be required to produce the entire speed of the driven shaft were the pump stationary. This condition, of course, holds true regardless of the level of the speed, that is, either at the low idling speeds or the high take-off speeds.

The cam 263 is herein shown as having a substantially straight-line working edge engaged by the stem 261 of the servo valve means and results in one desired response of the transmission to changing conditions determined by the pressure responsive means 30. It is to be understood, however, that the working edge of the cam may be given any desired contour so as to bring about any desired response of the transmission to changing conditions. Thus variations in the characteristics or calibrations of the pressure responsive means 30 may readily be compensated for by employment of a cam having the proper contour of working edge, or the response of the transmission may be varied. This unusual flexibility is highly desirable for airplane use where the changing conditions encountered may necessitate a different response or operation of the transmission.

I claim as my invention:

1. In a hydraulic transmission, a driving element, a driven element and means operatively interposed between said elements for driving said driven element above or below the speed of said driving element comprising a rotatable cylinder block comprising a main block having a circular recess at one end and a first plurality of parallel cylinders opening at one end to the recess formed therein, an annular plate mounted over the recessed face of said main block to form of the recess a valve chamber and a cylinder block head mounted over said annular plate and having a circular recess formed in the face thereof adjacent said plate to form therewith a second valve chamber, a second plurality of parallel cylinders formed in said main block, said head and said annular plate, passages formed in said head affording communication between said second valve chamber and said second plurality of cylinders and in said plate affording communication between said chambers, a stationary eccentric projecting into said second chamber, a movable eccentric carried by said driven element and projecting into said first chamber, a wheel-like disk valve having a sliding fit in each chamber and rotatably mounted one on each eccentric, means for converting the rotary motion of said cylinder block and the reciprocatory motion of said motor pistons into rotary motion of said driven shaft, and a stationary motion converting means engaging the pistons in said pump cylinders, said last named means being adjustable to vary the quantity and direction of fluid discharged from said pump to cause said driven element to be rotated above or below the speed of said driving element.

2. In a hydraulic transmission, a fluid motor, a pump for supplying the fluid to drive said motor, means providing passages interconnecting said pump and said motor including a chamber from which the pump draws its supply of fluid and to which the motor discharges fluid and a discharge passage leading from said chamber, a relief valve in said discharge passage to maintain a given pressure in the chamber, and means including a separate inlet passage for supplying fluid to said chamber in excess of the make-up requirements of said pump and motor circuit so as to continuously replace some of the fluid in the pump-motor circuit and force it out through the discharge passage.

3. In a hydraulic transmission, a motor of the reciprocatory piston type, a pump of the reciprocatory piston type providing the fluid to operate said motor, means forming a circuit for said pump and said motor including a chamber from which the pump draws its fluid and to which the motor discharges its fluid, a fluid supply passage leading to the chamber and a separate discharge passage leading from the chamber, a relief valve controlling the flow of fluid through said discharge passage to maintain a predetermined pressure in said chamber, and means for supplying fluid to said chamber in excess of the make-up quantity required by said pump and motor circuit whereby a portion of the fluid in the pump and motor circuit is discharged through said discharge passage, and the fluid so discharged is replaced by said excess fluid.

4. In a hydraulic transmission, a pump comprising a cylinder block having a plurality of cylinders formed therein, a valve chamber and passages providing communication between said cylinders and said valve chamber, a piston reciprocable in each cylinder and means for driving said pistons through a discharge stroke, a motor adapted to be driven by the fluid discharged by said pump comprising a cylinder block having a plurality of cylinders formed therein and a valve chamber in communication with each of the cylinders through one end thereof, a piston reciprocable in each cylinder and means for converting the reciprocatory motion of said pistons into rotary motion, a chamber having a fluid supply passage leading thereto and a separate discharge passage leading therefrom, said chamber being constantly in communication with said valve chambers, a wheel-like disk valve in each chamber operable in timed relationship with the fluid device with which it is associated to connect the cylinders alternatively to said central chamber or to the peripheral portions of said valve chamber, a passage interconnecting the peripheral portions of said valve chambers, a relief valve controlling the flow of fluid through the discharge passage, and means for supplying fluid to said chamber substantially in excess of the fluid required by said pump whereby a portion of the fluid in the pump and motor circuit is discharged through said discharge passage, and the fluid so discharged is replaced by said excess fluid.

5. In a system for supercharging cabins of aircraft which includes a blower, a conduit connecting the blower to the cabin and an engine having a power take-off, a hydraulic transmission having an input shaft driven from the aircraft engine power take-off and an output shaft geared to the blower, means for varying the speed of the output shaft above and below the speed of the input shaft, and means for adjusting said speed varying means comprising a pair of opposed and unequal piston and cylinder devices, means for constantly subjecting the smaller of said piston and cylinder devices to fluid under pressure tending to adjust said speed varying means to reduce the speed of the output shaft, and means for supplying fluid to the larger piston and cylinder device to adjust said speed varying means to increase the speed of the output shaft comprising means responsive to the flow of air through said conduit to the cabin, a valve associated with said last named means and shifted thereby in accordance with variations in the air flow, and a member surrounding said valve mounted for movement in accordance with the position of the speed varying means, said valve and surrounding member having cooperating passages controlling the flow of fluid to the larger piston and cylinder device.

6. In a system for supercharging an aircraft cabin which includes a blower for supercharging the cabin and means including a venturi through which the blower discharges air into the cabin and an engine having a power take-off, a hydraulic transmission having an input shaft driven from the aircraft engine power take-off and an output shaft geared to the blower, means for varying the speed of the output shaft above and below the speed of the input shaft, and means for adjusting said speed varying means comprising a pair of opposed and unequal piston and cylinder devices, means for constantly subjecting the the smaller of said piston and cylinder devices to fluid under pressure tending to adjust said speed varying means to reduce the speed of the output shaft, and means for supplying fluid to the larger piston and cylinder device to adjust said speed varying means to increase the speed of the output shaft comprising a diaphragm subjected on one side to the reduced pressure at the throat of the venturi and on its other side to the higher pressure on the air inlet side of the venturi, a valve connected to said diaphragm, and a member surrounding said valve mounted for movement in accordance with the position of the speed varying means, said valve and surrounding member having cooperating passages controlling the flow of fluid to the larger piston and cylinder device.

7. In a system for supercharging an aircraft cabin which includes a blower for supercharging the cabin, a conduit connecting the blower to the cabin and an engine having a power take-off, a hydraulic transmission having an input shaft driven from the engine power take-off and an output shaft geared to the blower, means for varying the speed of the output shaft above and below the speed of the input shaft, means for adjusting said speed varying means comprising a pair of opposed and unequal piston and cylinder devices, means for constantly subjecting the smaller of said piston and cylinder devices to fluid under pressure tending to adjust said speed varying means to reduce the speed of the output shaft, and means for supplying fluid to the larger piston and cylinder device to adjust said speed varying means to increase the speed of the output shaft comprising means indicative of the air condition in the cabin, a valve associated with said last named means and shifted thereby in accordance with variations in the air condition in the cabin, a member surrounding said valve mounted for movement in accordance with the position of the speed varying means, said valve and surrounding member having cooperating passages controlling the flow of fluid to the larger piston and cylinder device, and additional means exercising control over the fluid supplied to said larger piston and cylinder device comprising a cut-off valve.

8. In a system for supercharging an aircraft cabin which includes a blower for supercharging the cabin, a conduit connecting the blower to the cabin and an engine having a power take-off, a hydraulic transmission having an input shaft driven from the engine power take-off and an output shaft geared to the blower, means for varying the speed of the output shaft above and below the speed of the input shaft, means for adjusting said speed varying means comprising a pair of opposed and unequal piston and cylinder devices, means for constantly subjecting the smaller of said piston and cylinder devices to fluid under pressure tending to adjust said speed varying means to reduce the speed of the output shaft, and means for supplying fluid to the larger piston and cylinder device to adjust said speed varying means to increase the speed of the output shaft comprising means indicative of the air condition in the cabin, a valve associated with said last named means and shifted thereby in accordance with variations in the air condition in the cabin, a member surrounding said valve mounted for movement in accordance with the position of the speed varying means, said valve and surrounding member having cooperating passages controlling the flow of fluid to the larger piston and cylinder device, and additional means exercising control over the fluid supplied to said larger piston and cylinder device comprising a cut-off valve, and means for actuating said cut-off valve including means responsive to the speed of said output shaft.

9. In a system for supercharging an aircraft cabin which includes a blower for supercharging the cabin, a conduit connecting the blower to the cabin and an engine having a power take-off, a hydraulic transmission having an input shaft driven from the engine power take-off and an output shaft geared to the blower, means for varying the speed of the output shaft above and below the speed of the input shaft, means for adjusting said speed varying means comprising a pair of opposed and unequal piston and cylinder devices, means for constantly subjecting the smaller of said piston and cylinder devices to fluid under pressure tending to adjust said speed varying means to reduce the speed of the output shaft, and means for supplying fluid to the larger piston and cylinder device to adjust said speed varying means to increase the speed of the output shaft comprising means indicative of the air condition in the cabin, a valve associated with said last named means and shifted thereby in accordance with variations in the air condition in the cabin, a member surrounding said valve mounted for movement in accordance with the position of the speed varying means, said valve and surrounding member having cooperating passages controlling the flow of fluid to the larger piston and cylinder device, and additional means exercising control over the fluid supplied to said larger piston and cylinder device comprising a cut-off valve biased in a direction to permit flow of fluid to said larger piston and cylinder device, and means responsive to the speed of said output shaft acting in opposition to the bias of said valve.

10. In a system for supercharging an aircraft cabin which includes a blower for supercharging the cabin, a conduit connecting the blower to the cabin and an engine having a power take-off, a hydraulic transmission having an input shaft driven from the engine power take-off and an output shaft geared to the blower, means for varying the speed of the output shaft above and below the speed of the input shaft, means for adjusting said speed varying means comprising a pair of opposed and unequal piston and cylinder devices, means for constantly subjecting the smaller of said piston and cylinder devices to fluid under pressure tending to adjust said speed varying means to reduce the speed of the output shaft, and means for supplying fluid to the larger piston and cylinder device to adjust said speed varying means to increase the speed of the output shaft comprising means responsive to the flow of air through said conduit to the cabin, a valve associated with said last named means and shifted thereby in accordance with variations in the air flow, a casing for said valve mounted for movement in accordance with the position of the speed varying means, said valve and casing having cooperating passages controlling the flow of fluid to the larger piston and cylinder device, and additional means exercising control over the fluid supplied to said larger piston and cylinder device comprising a hydraulically actuated cut-off valve, a spring biasing said cut-off valve in a direction to permit flow of fluid to said larger piston and cylinder device and centrifugal means driven from said output shaft and connected to said cut-off valve to subject said cut-off valve to a pressure varying with the speed of said output shaft.

11. In a system for supercharging an aircraft cabin which includes a blower for supercharging the cabin and means including a venturi through which the blower discharges air into the cabin and an engine having a power take-off, a hydraulic transmission having an input shaft driven from the aircraft engine power take-off and an output shaft geared to the blower, means for varying the speed of the output shaft above and below the speed of the input shaft and means for adjusting said speed varying means comprising a pair of opposed and unequal piston and cylinder devices, means for constantly subjecting the smaller of said piston and cylinder devices to fluid under pressure tending to reduce the speed of the output shaft and means for supplying fluid to the larger piston and cylinder device for increasing the speed of the output shaft comprising a diaphragm subjected on one side to the reduced pressure at the throat of the venturi and on its other side to the higher pressure on the air inlet side of the venturi, a valve connected to said diaphragm, a member surrounding said valve mounted for movement in accordance with the position of the speed varying means, said valve and member having cooperating passages controlling the flow of fluid to the larger piston and cylinder device, and additional means for controlling the pressure of said fluid comprising a cut-off valve and means for actuating said cut-off valve including a centrifugal pump driven by the output shaft and generating a static pressure against one end of said cut-off valve.

12. In a system for supercharging an aircraft cabin which includes a blower for supercharging the cabin, a conduit connecting the blower to the cabin and an engine having a power take-off, a hydraulic transmission having an input shaft driven from the engine power take-off and an output shaft geared to the blower, means for varying the speed of the output shaft above and below the speed of the input shaft, means for adjusting said speed varying means comprising a pair of opposed and unequal piston and cylinder devices, and means for supplying and controlling actuating fluid for said piston and cylinder devices comprising a pump driven from the aircraft engine power take-off, means for maintaining the fluid discharged from said pump at a predetermined pressure value, a conduit leading from said pump directly to the smaller of said piston and cylinder devices constantly to supply fluid under pressure, said smaller piston and cylinder device under the influence of the fluid tending to reduce the speed of the output shaft, a conduit for supplying fluid from said pump to the larger of said piston and cylinder devices at appropriate times to increase the speed of said output shaft, control means for said last mentioned conduit including a servo valve means interposed in said last named conduit, means indicative of the air condition in the cabin for actuating one part of said servo valve and means associated with said speed varying means for actuating the other part of said valve, and a cut-off valve also connected in said last named conduit and acting in response to the speed of said output shaft to cut off the supply of fluid to the larger piston and cylinder device and permit discharge of fluid therefrom when the speed of the output shaft exceeds a predetermined value.

13. In combination, a driving element, a driven element, a hydraulic transmission operatively interposed between said elements including adjustable means for varying the operation of said transmission, means for adjusting said adjustable means comprising a pair of opposed and unequal piston and cylinder devices, means for constantly subjecting the smaller of said piston and cylinder devices to fluid under pressure, and means for supplying and controlling the supply of fluid to the larger piston and cylinder device including a valve having automatically operable actuating means responsive to changes in pressure of a fluid, and a manual valve operable in one position to render said first named valve effective in the control of the supply of fluid to said larger piston and cylinder device and in another position removing control from said first named valve and connecting said larger piston and cylinder device to permit free discharge of fluid therefrom.

14. In combination, a driving element, a driven element, a hydraulic transmission operatively interposed between said elements including adjustable means for varying the operation of said transmission, means for adjusting said adjustable means comprising a pair of opposed and unequal piston and cylinder devices, means for constantly subjecting the smaller of said piston and cylinder devices to fluid under pressure, and means for supplying and controlling the supply of fluid to the larger piston and cylinder device including a valve having automatic actuating means responsive to changes in pressure of a fluid, a second valve means responsive to the speed of said driven element, and a manual valve operable in one position to render said first named valve effective in the control of the supply of fluid to said larger piston and cylinder device and in another position removing control from said first named valve and connecting said larger piston and cylinder device to permit free discharge of fluid therefrom.

15. In combination, a power source including a hydraulically controlled clutch, a driving element driven from said power source through said clutch, a driven element, a hydraulic transmission operatively interposed between said elements including adjustable means for varying the operation of said transmission, means for adjusting said adjustable means comprising a pair of opposed and unequal piston and cylinder devices, means for constantly subjecting the smaller of said piston and cylinder devices to fluid under pressure, means for supplying actuating fluid for said clutch and the larger of said piston and cylinder devices, and means for governing the supply of fluid including valve means controlling the supply of fluid to the larger piston and cylinder device having actuating means responsive to a condition to be met by proper operation of said transmission, and a manually actuable valve controlling the supply of fluid to said clutch having a clutch engaged position and a clutch disengaged position, said manual valve in its clutch disengaged position removing control of the fluid supplied to the larger piston and cylinder device from said first mentioned valve and connecting the larger piston and cylinder device to permit free discharge of fluid therefrom.

16. In combination, a power source including a hydraulically controlled clutch, a driving element driven from said power source through said clutch, a driven element, a hydraulic transmission operatively interposed between said elements including adjustable means for varying the operation of said transmission, means for adjusting said adjustable means comprising a pair of opposed and unequal piston and cylinder devices, and means for supplying and controlling actuating fluid for said piston and cylinder devices and said clutch comprising a pump, means for maintaining the fluid discharged from said pump at a predetermined pressure value, a conduit leading from said pump directly to the smaller of said piston and cylinder devices constantly to supply fluid under pressure thereto, a conduit for supplying fluid from said pump to the larger of said piston and cylinder devices, a servo valve means interposed in said last named conduit, a system for supplying fluid for the actuation of said clutch, and a manually actuable valve interposed in said system and having a clutch engaged and a clutch disengaged position, said manually actuable valve also being interposed in the conduit leading to the larger of said piston and cylinder devices and operable in clutch engaged position to place control of the fluid flowing to the larger of said piston and cylinder devices under said servo valve and in clutch disengaged position to block said first named conduit and to connect the larger of said piston and cylinder devices for free discharge of the fluid therein.

17. In combination, a power source including a hydraulically controlled clutch, a driving element driven from said power source through said clutch, a driven element, a hydraulic transmission operatively interposed between said elements including adjustable means for varying the operation of said transmission, means for adjusting said adjustable means comprising a pair of opposed and unequal piston and cylinder devices, and means for supplying and controlling actuating fluid for said piston and cylinder devices and said clutch comprising a pump, means for maintaining the fluid discharged from said pump at a predetermined pressure value, a conduit leading from said pump directly to the smaller of said piston and cylinder devices constantly to supply fluid under pressure thereto, a conduit for supplying fluid from said pump to the larger of said piston and cylinder devices, a servo valve means interposed in said last named conduit, a system for supplying fluid for the actuation of said clutch, a manually actuable valve interposed in said system and having a clutch engaged and a clutch disengaged position, said manually actuable valve also being interposed in the conduit leading to the larger of said piston and cylinder devices and operable in clutch engaged position to place control of the fluid flowing to the larger of said piston and cylinder devices under said servo valve and in clutch disengaged position to block said first named conduit and to connect the larger of said piston and cylinder devices for free discharge of the fluid therein, a third valve interposed in said first named conduit normally permitting flow of fluid through said conduit, and means responsive to the speed of said driven element operable as the speed thereof increases to certain values to urge said third valve in a direction to cut off the flow of fluid through said last named conduit and eventually to connect the larger of said piston and cylinder devices for the free discharge of fluid therefrom.

18. In a system for supercharging an aircraft cabin, which includes a blower for supercharging the cabin and means including a venturi through which the blower discharges air into the cabin and an engine having a power take-off, a hydraulically actuated clutch driven from the aircraft engine power take-off, a hydraulic transmission having an input shaft driven from the aircraft engine power take-off through said clutch and an output shaft geared to the blower, means for varying the speed of the output shaft above and below the speed of the input shaft, means for adjusting said speed varying means comprising a pair of opposed and unequal piston and cylinder devices, adjustment of said speed varying means under the influence of the smaller of said piston and cylinder devices reducing the speed of the output shaft relative to the input shaft and adjustment of said speed varying means under the influence of the larger of said piston and cylinder devices adjusting said speed varying means to increase the speed of the output shaft relative to the input shaft, means for supplying and controlling actuating fluid for said piston and cylinder devices and said clutch comprising a pump driven directly from the aircraft engine power take-off, means for maintaining the fluid discharged from said pump at a predetermined pressure value, a conduit leading from said pump directly to the smaller of said piston and cylinder devices constantly to supply fluid under pressure thereto, a conduit for supplying fluid from said pump to the larger of said piston and cylinder devices, a servo valve means interposed in said last named conduit to control the flow of fluid thereto including cooperating parts one actuated by said speed varying means, a pressure responsive device for actuating the other of said parts having connection to the venturi and the air inlet side of the conduit through which the blower supplies air to the aircraft cabin, a system for supplying fluid for the actuation of said clutch, a manually actuable valve interposed in said system and having a clutch engaged and a clutch disengaged position, said manually actuable valve also being interposed in the conduit leading to the larger of said piston and cylinder devices and operable in clutch engaged position to place control of the fluid flowing to the larger of said piston and cylinder devices under said servo valve and in clutch disengaged position to block said first named conduit and to connect the larger of said piston and cylinder devices for free discharge of the fluid therein, a third valve interposed in said first named conduit normally permitting flow of fluid through said conduit, and means responsive to the speed of said driven element operable as the speed thereof increases to certain values to urge said third valve in a direction to cut off the flow of fluid through said last named conduit and eventually to connect the larger of said piston and cylinder devices for the free discharge of fluid therefrom.

19. In combination, a driving element, a driven element, a hydraulic transmission operatively interposed between said elements including adjustable means for varying the operation of said transmission, means for adjusting said adjustable means including hydraulically actuated devices, means for supplying and controlling the supply of fluid to said devices including a servo valve means having a follow-up member, and a cam carried by said adjustable means and engaged by said follow-up member whereby the response of the transmission to said fluid supply and control means may be varied by variation in said cam.

20. In combination, a driving element, a driven element, a hydraulic transmission operatively interposed between said elements including a wobbler adjustable to vary the operation of said transmission, hydraulically actuated means for adjusting said wobbler, means for supplying and for controlling the supply of fluid to said hydraulically actuated means including a servo valve means having a shiftable valve member adapted to be actuated by changes in the position of said wobbler, and a cam carried by said wobbler and engaged by said valve member providing a connection capable of ready variation to facilitate varying the response to be obtained by said hydraulic transmission to said fluid supplying and control means.

21. In combination, a hydraulic transmission having an input shaft and an output shaft, means for varying the speed of the output shaft above and below the speed of the input shaft, means for adjusting said speed varying means comprising hydraulically actuated devices, means for supplying and for controlling the supply of fluid to said hydraulic devices including a servo valve, a member surrounding said valve mounted for movement in accordance with the position of said speed varying means, said valve and surrounding member having cooperating passages controlling the flow of fluid governing said hydraulic devices, and means responsive to the speed of said output shaft depriving said fluid supplying and controlling means of its sole control over said hydraulic devices when the speed of said output shaft exceeds a predetermined value.

22. In combination with an aircraft cabin, a blower for supercharging the cabin, and a conduit connecting the blower to the cabin, a hydraulic transmission having an input shaft driven from the aircraft engine power take-off and an output shaft geared to the blower, means for varying the speed of the output shaft above and below the speed of the input shaft, and means for adjusting said speed varying means comprising a piston and cylinder device, means for constantly urging the piston in one direction tending to adjust said speed varying means to reduce the speed of the output shaft, and means for supplying fluid to actuate the piston to adjust said speed varying means to increase the speed of the output shaft comprising means responsive to the flow of air through said conduit to the cabin, a valve associated with said last named means and shifted thereby in accordance with variations in the air flow, and a member surrounding said valve mounted for movement in accordance with the position of the speed varying means, said valve and surrounding member having cooperating passages controlling the flow of fluid to said piston.

23. In combination, a power source including a hydraulically controlled clutch, a driving element driven from said power source through said clutch, a driven element, a hydraulic transmission operatively interposed between said elements including adjustable means for varying the operation of said transmission, means for adjusting said adjustable means comprising a piston and cylinder device, means for constantly urging the piston in one direction, means for supplying actuating fluid for said clutch and to said piston and cylinder device to move the piston in the opposite direction, and means for governing the supply of fluid including valve means controlling the supply of fluid to the piston and cylinder device having actuating means responsive to a condition to be met by proper operation of said transmission, and a manually actuable valve controlling the supply of fluid to said clutch having a clutch engaged position and a clutch disengaged position, said manual valve in its clutch disengaged position removing control of the fluid supplied to the piston and cylinder device from said first mentioned valve and connecting the piston and cylinder device to permit free discharge of fluid therefrom.

GUNNAR A. WAHLMARK.

REFERENCES CITED

The following references are of record in the file of this patent:

UNITED STATES PATENTS

| Number | Name | Date |
|---|---|---|
| 1,297,734 | Rayburn et al. | Mar. 18, 1919 |
| 1,655,683 | Standerwick | Jan. 10, 1928 |
| 1,726,454 | Rayburn et al. | Aug. 27, 1929 |
| 1,837,382 | Waller | Dec. 22, 1931 |
| 1,840,864 | Rayburn et al. | Jan. 12, 1932 |
| 1,840,866 | Rayburn et al. | Jan. 12, 1932 |
| 1,908,144 | Gros | May 9, 1933 |
| 1,952,570 | Smith et al. | Mar. 27, 1934 |
| 2,063,477 | Young et al. | Dec. 8, 1936 |
| 2,148,277 | Rose | Feb. 21, 1939 |
| 2,151,415 | Bennetch | Mar. 21, 1939 |
| 2,176,401 | Johns | Oct. 17, 1939 |
| 2,199,081 | Perin | Apr. 30, 1940 |
| 2,222,144 | Ferris | Nov. 19, 1940 |
| 2,257,724 | Bennetch | Oct. 7, 1941 |
| 2,284,984 | Nixon et al. | June 2, 1942 |
| 2,296,929 | Ifield | Sept. 29, 1942 |
| 2,353,201 | Talbot | July 11, 1944 |
| 2,377,199 | Adams et al. | May 29, 1945 |
| 2,390,487 | Lawrence et al. | Dec. 4, 1945 |
| 2,393,172 | Larrecq | Jan. 15, 1946 |
| 2,414,202 | Jepson et al. | Jan. 14, 1947 |

FOREIGN PATENTS

| Number | Country | Date |
|---|---|---|
| 508,434 | France | July 24, 1920 |